United States Patent Office 3,338,272
Patented Aug. 29, 1967

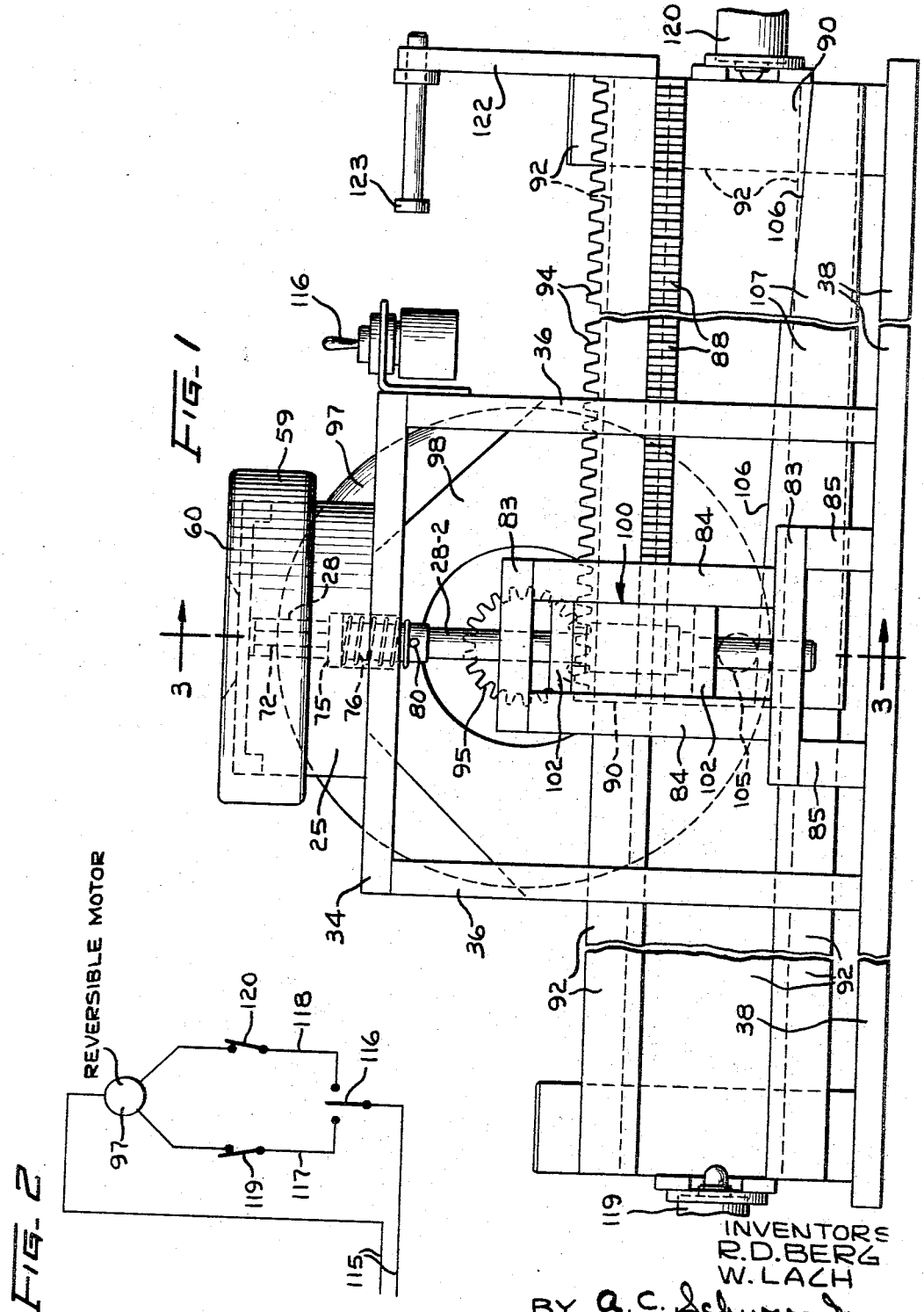

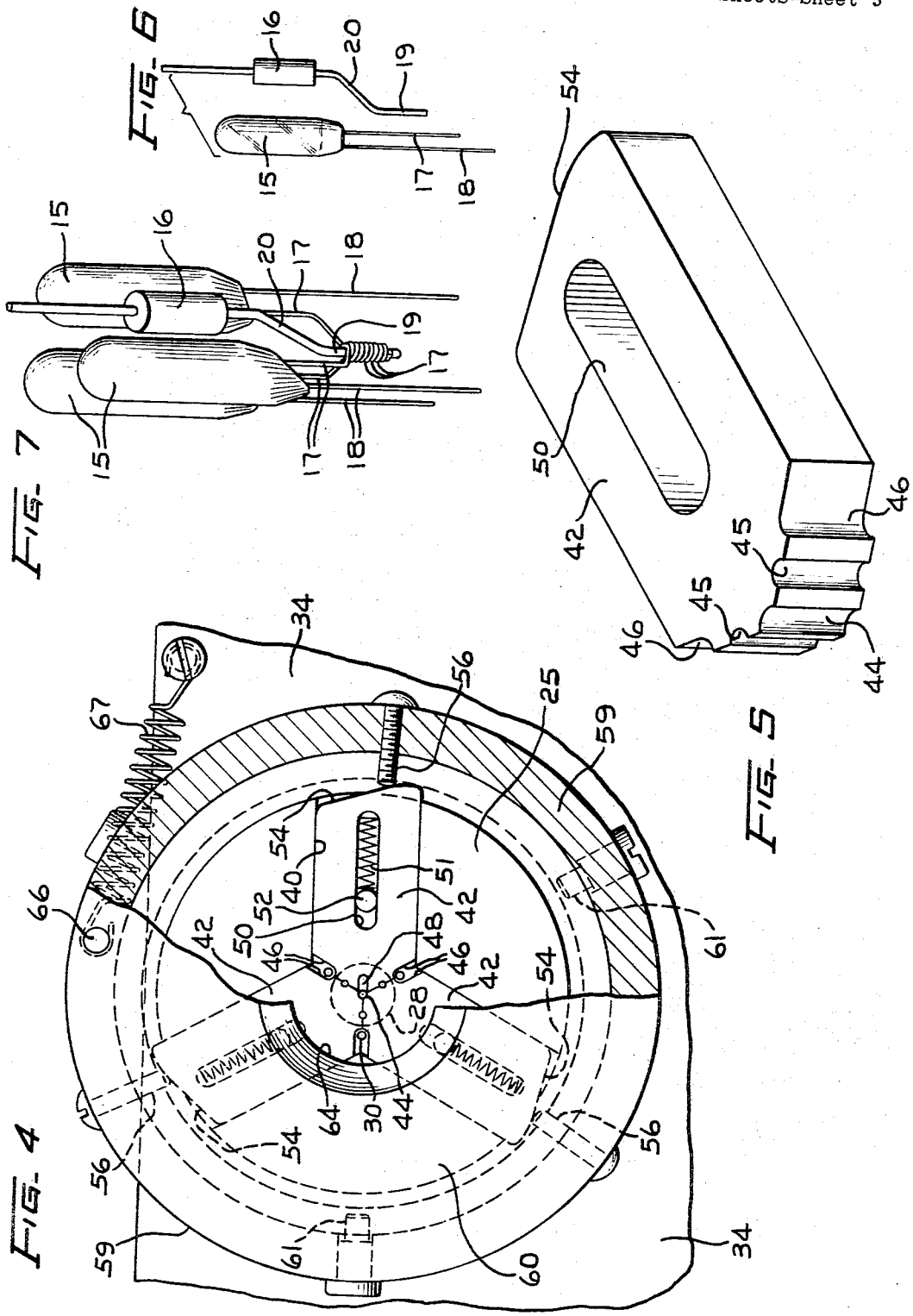

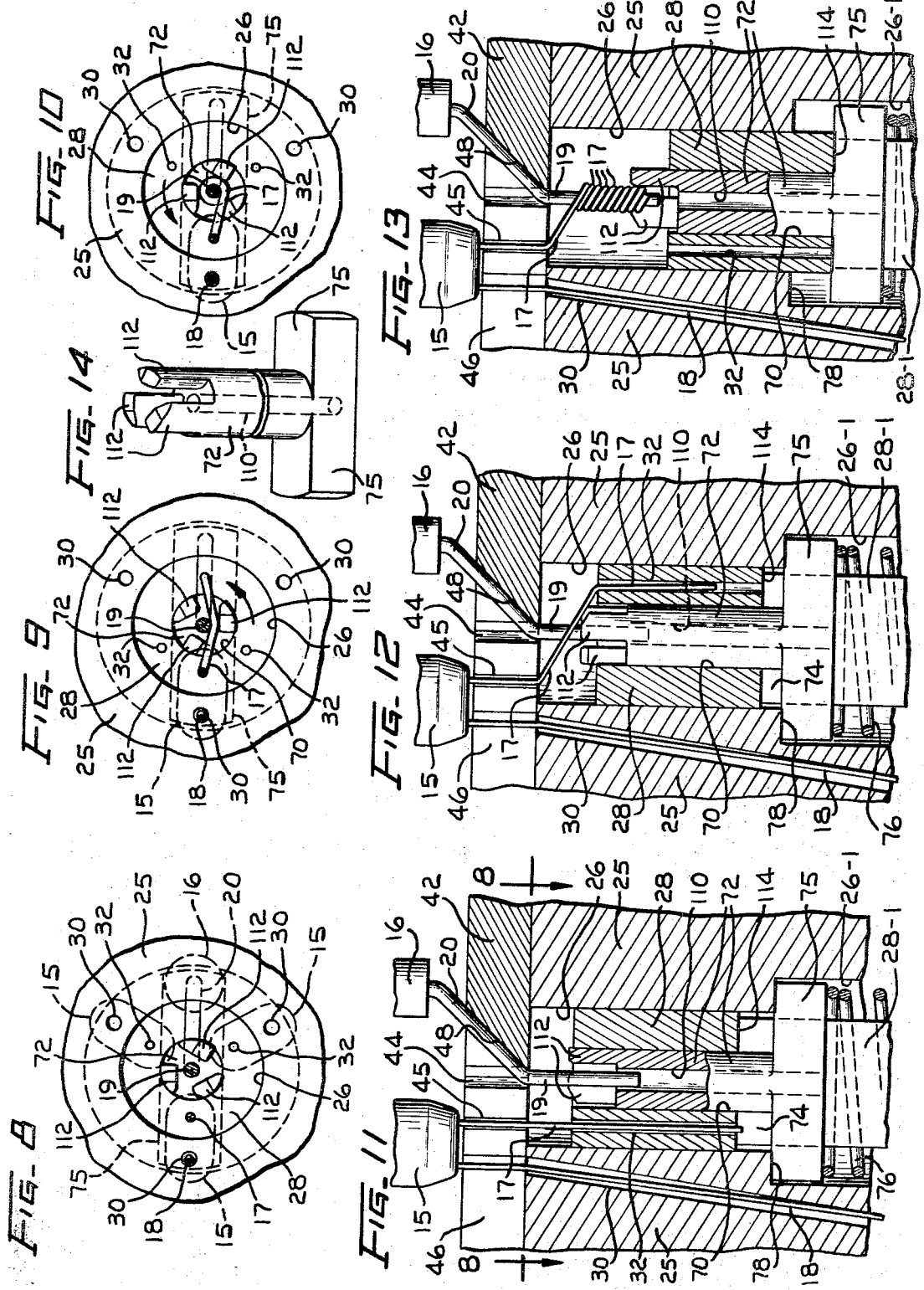

3,338,272
DEVICE FOR WINDING AN ELONGATED ELEMENT AROUND AN ARTICLE
Richard D. Berg, Elmhurst, and Walter Lach, La Grange Park, Ill., assignors to Western Electric Company, Incorporated, New York, N.Y., a corporation of New York
Filed July 9, 1965, Ser. No. 470,712
7 Claims. (Cl. 140—93)

This invention relates to a device for winding an elongated element around an article, and more particularly to mechanism for simultaneously winding a plurality of leads of electrical components helically around a terminal of another electrical component and for wiping the trailing ends of the leads against the terminal.

An object of the present invention is to provide a device for bending an elongated element helically around an article.

A further object of the invention is to provide a device for simultaneously winding a plurality of leads around a terminal and for bending the trailing end portions of the leads against the terminal.

A device illustrating certain features of the invention may include a winding shaft mounted for rotation about a vertical axis and for axial movement and having three axially directed apertures in the upper end thereof in spaced relation to the axis for receiving leads of three electrical components. The shaft also has an end recess along the axis thereof in which a centrally apertured wiping member is mounted for rotation with the shaft and for limited axial movement relative thereto. Three fingers extend upwardly from the upper end of the wiping member in parallel and laterally spaced relation to each other and to the axis and are positioned vertically within the shaft recess in the normal upper position of the shaft.

A holder is mounted above the shaft for supporting the components with the end portions of the leads thereof extending downwardly into the lead-receiving recesses of the shaft and for supporting another electrical component with the end portion of a terminal thereof extending downwardly along the axis and between the fingers of the wiping member. Drive mechanism is provided for selectively rotating the shaft in opposite directions through a predetermined number of revolutions and for lowering and raising the shaft in timed relation to the rotation thereof.

With the winding shaft in its normal upper position and with the electrical components supported in the holder, and in response to actuation of the drive means, the shaft is caused to rotate and move downward, during the initial portion of which movement the leads are carried laterally into engagement with the terminal and thereafter successive portions of the leads are withdrawn from the shaft recesses and wound helically and downwardly around the terminal. During the initial portion of the rotary and downward movement of the shaft, the wiping fingers are held against downward movement and emerge from the shaft as the latter moves downwardly, and the fingers assume a position laterally of and in close proximity to the convolutions of the leads wound on the terminal, and serve, subsequently, to engage the end portions of the leads and press them against the terminal.

Other objects, advantages and novel aspects of the invention will become apparent upon consideration of the following detailed description, in conjunction with the accompanying drawings, in which:

FIG. 1 is a fragmentary front elevational view of the lead wrapping device embodying the present invention;

FIG. 2 is a diagram of the electrical control of the device;

FIG. 4 is an enlarged fragmentary plan view of the device showing the holding mechanism for supporting the components during the lead wrapping operation;

FIG. 5 is an enlarged perspective view of one of the lead gripping jaws of the device;

FIG. 6 is a side view of two of the electrical components of the type which are to be interconnected with the present device;

FIG. 7 is a perspective view of the electrical components in interconnected relation to one another;

FIGS. 8–10 are enlarged fragmentary plan sectional views of a portion of the apparatus taken on line 8—8 of FIG. 11 and showing different positions of the lead wrapping mechanism of the device;

FIGS. 11–13 are enlarged fragmentary vertical sectional views of the devices shown in FIGS. 8–10; and FIG. 14 is a perspective view of a lead wiping member of the device.

Figure 3:
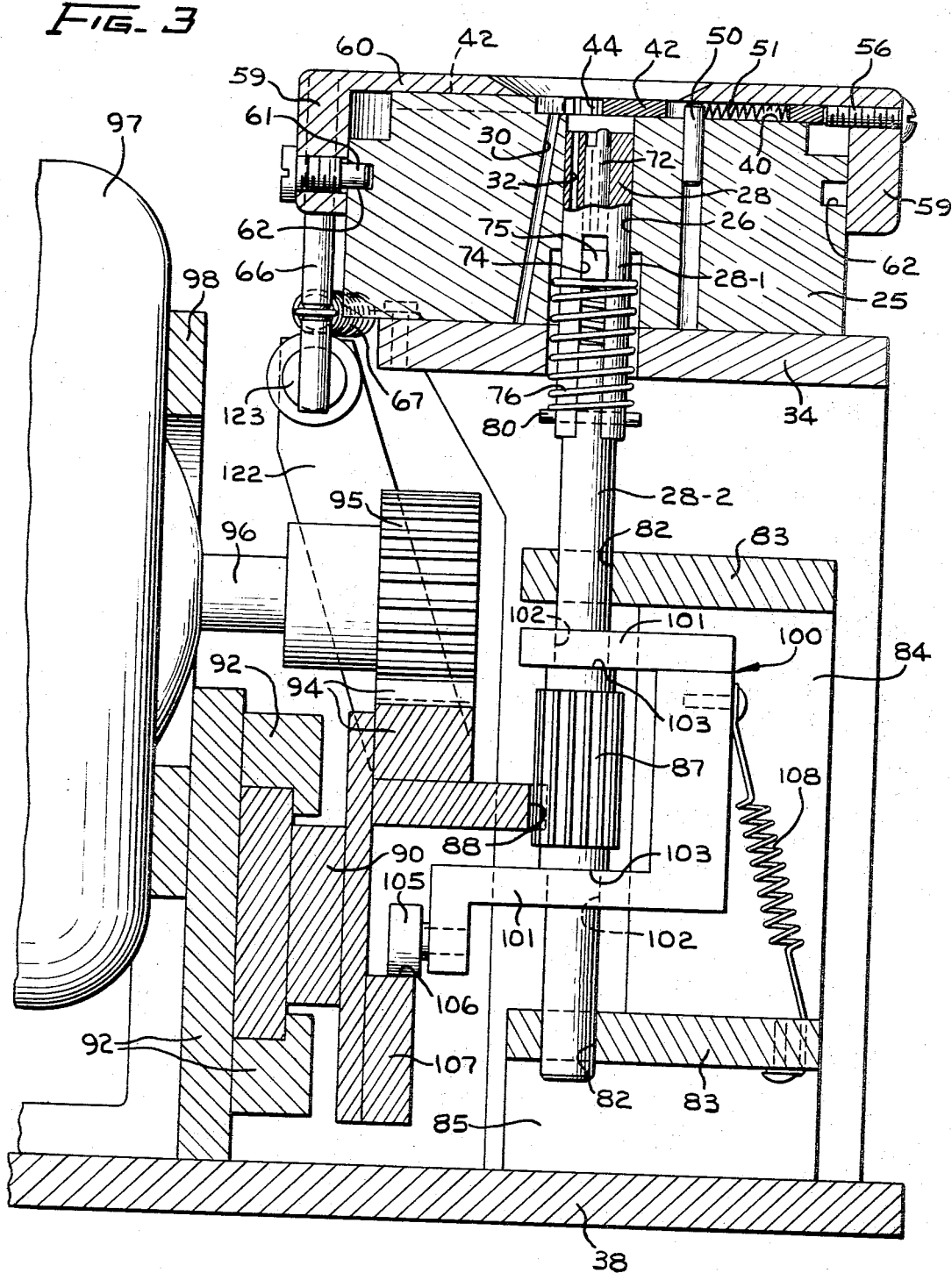
FIG. 3 is an enlarged vertical cross-sectional view through the device taken on the line 3—3 of FIG. 1.

Referring to FIGS. 6 and 7 of the drawings, the apparatus is designed to support electrical components in the form of three neon tubes 15 and a resistor 16 with the leads 17 and 18 of each of the bulbs disposed in substantially parallel and radially spaced relation to the resistor lead 19, and to wind simultaneously one lead 17 of each of the three bulbs helically around the resistor lead 19, and to wipe the trailing ends of the bulb leads tightly against the resistor lead. The end portion of the lead 19 is supported by an oblique portion 20 in offset relation to the axis of the resistor as shown in FIG. 6. To avoid confusion the resistor lead 19 will be referred to hereinafter as a terminal.

The apparatus comprises a circular holder 25 (FIGS. 1, 3, 4, 8–13) having a central vertically disposed bearing aperture 26 for receiving a winding shaft 28 and having three apertures 30 for receiving one lead 18 of each of the bulbs 15. The apertures 30 are disposed in slightly inclined relation to the axis of the shaft 28. The other bulb leads 17 are received in apertures 32 formed in the winding shaft 28 in parallel and radially spaced relation to the axis thereof and equally spaced circumferentially therearound. The holder 25 is secured to a horizontal platform 34 which in turn is supported on vertically disposed frame plates 36 secured to and extending outwardly from a horizontal base plate 38.

Slidably mounted in guideways 40 formed in the holder 25 in equiangularly spaced relation to one another are three jaws 42 which serve to clamp the bulb leads 17 and the resistor lead 19 and support the components 15 and 16 during the lead winding operation. Each of the jaws 42 at one end thereof has a pair of converging end walls and is provided with an end groove 44 engageable with the resistor terminal 19, a pair of grooves 45 engageable with bulb leads 17, and recesses 46 for receiving bulb leads 18. In their closed position, the three jaws 42 cooperate with one another to form a nest for receiving and supporting the resistor terminal 19, and the bulb leads 17 and 18. The groove 44 on one of the jaws 42 has a laterally directed portion 48 (FIGS. 11–13) for receiving the obliquely disposed portion 20 of the terminal 19 and supporting the resistor 16 at a predetermined elevation.

In a central slot 50 in each of the jaws 42 a spring 51 (FIGS. 3 and 4) is provided which reacts between the end of the slot 50 and a fixed pin 52 in the holder 25 to urge the jaw 42 to a retracted or open position. At the other ends thereof, the jaws 42 are provided with oblique cam surfaces 54 which engage oscillatable actuating pins 56 and cooperate with the springs 57 for effecting the reciprocation of the jaws. The actuating pins 56 are mounted on an annular flange 59 of a cap member 60 which is oscillatably supported on the holder 25.

A plurality of pins 61 project inwardly from the annular flange 59 into an annular groove 62 on the holder 25 for retaining the cap 60 thereon. The upper wall of the cap is centrally apertured at 64 to provide clearance for movement of the leads 17 and 18 and the terminal 19 into the holder 25. Secured to and projecting downwardly from the flange 59 of the cap 60 is a pin 66 (FIGS. 3 and 4) to which a spring 67 is connected to urge the cap 60 for rotation in a direction to effect the actuation of the clamping jaws 42 to the closed position, as shown in FIG. 4.

The winding shaft 28 is a composite structure, the upper portion 28–1 of which has a bore 70 for receiving a cylindrical wiping member 72 (FIGS. 11–14) and which has a transverse slot 74 for receiving laterally directed arms 75 of the wiping member. The ends of the arms 75 extend into a counterbored portion 26–1 of the bearing aperture 26 in the holder 25 and are urged upwardly by a helical compression spring 76 to a normal upper position in engagement with a shoulder 78 on the holder 25.

The lower end of the spring 76 (FIG. 3) is supported on the projecting end portions of a pin 80 which connects the upper slotted shaft section 28–1 with the upper reduced end portion of a lower section 28–2 of the winding shaft 28. The lower shaft section 28–2 is supported for rotation and vertical axial movement in bearing apertures 82 in a pair of horizontal bearing plates 83. The upper bearing plate 83 is secured at its ends to a pair of vertical frame plates 84 (FIG. 1) that are fixedly mounted on the lower bearing plate 83 which in turn is fixedly mounted on spacer members 85 secured to the base plate 38.

An elongated gear 87 is secured to the winding shaft 28 and meshes with a rack 88 which is mounted on a carrier 90. The carrier is supported for horizontal movement in a guideway of a guide 92 that is secured to the base plate 38. Also mounted on the carrier 90 is a second rack 94 which meshes with a gear 95 on the shaft 96 of a reversible drive motor 97 that is suitably supported on a frame member 98.

To insure the proper helical winding of the leads 17 onto the terminal 19, mechanism including a yoke 100 (FIG. 3) is provided for moving the winding shaft 28 axially in timed relation to the rotation thereof. The yoke 100 has a pair of horizontal arms 101 which are provided with bearing apertures 102 for receiving the winding shaft 28 and which engage annular shoulders 103 on ends of the gear 87. The yoke 100 is movable vertically between the vertical frame members 84 (FIG. 1) and is held thereby against rotation. Secured to the lower end of the yoke is a cam follower 105 that rides on an inclined surface 106 of an elongated cam 107 that is mounted on the carrier 90 for horizontal movement therewith and imparts vertical movement to the yoke 100 and the winding shaft 28 in response to reciprocation of the carrier. A spring 108 (FIG. 3) urges the yoke 100 downward to maintain the cam follower 105 in engagement with the cam 107.

Returning to the wiping member 72 (FIGS. 3, 8–14), a central aperture 110 extends axially therethrough for receiving the end portion of the terminal 19. At its upper end, the wiper member has three fingers 112 extending upwardly therefrom in circumferentially spaced relation to each other and with the inner surfaces thereof spaced from the terminal 19 a distance slightly greater than the diameter of the lead 17 which is to be wound around the terminal.

In the normal upper position of the winding shaft 28 and the wiping member 72, the wiping fingers 112 are positioned substantially within the aperture 70 of the winding shaft 28, in which position ample clearance is provided above the shaft and the ends of the wiping fingers 112 for movement of the leads 17 from an original straight position (FIG. 11) to a bent position in engagement with the terminal 19 (FIG. 12). The space between adjacent wiping fingers 112 (FIGS. 8–11) provides clearance for movement of the leads 17 between the fingers as the shaft 28 is progressively lowered and as successive portions of the leads 17 emerge from the upper end of the apertures 32 of the shaft 28 and are wound helically onto the terminal 19 and downwardly therealong into a zone in lateral alignment with the upwardly extending wiping fingers 112.

At a predetermined point in the lead winding operation, the cross arms 75 of the wiping member 72 engage stop surfaces 114 at the upper end of the slot 74 in the shaft 28 and cause the wiping member 72 to move downwardly with the winding shaft to maintain the wiping fingers 112 in horizontal or lateral alignment with the lowermost convolutions of the leads 17 being wound onto the terminal 19 and until the winding operation has been completed (FIG. 13). As the ends of the leads 17 emerge from the apertures 32 of the winding shaft 28 they project outwardly from the terminal and are engaged by the wiping fingers 112 and are wiped thereby tightly against the terminal 19 (FIG. 13).

Referring to FIG. 2, the reversible motor 97 is connected to a power line 115 through a manually operable, normally open reversing switch 116 and forward and reverse circuit branches 117 and 118, respectively. Normally closed switches 119 and 120 in the forward and the reverse branches 117 and 118, respectively, are mounted at opposite ends of the frame (FIG. 1) for actuation by the carrier at the end of each movement thereof in opposite directions to effect the stopping of the motor 97 and of the winding shaft 28 at the end of a predetermined number of revolutions of the latter. The switch 116 is suitably supported adjacent the platform 34 (FIG. 1).

As indicated hereinbefore, the three gripping jaws 42 of the holder 25 are moved to and yieldably retained in their normal closed position (FIG. 5) under the influence of the spring 67. Mechanism is provided for retracting the jaws 42 to an open position to permit the removal of the assembled components 15, 16 after the leads 17 have been wound around the terminal 19. The mechanism includes an arm 122 (FIGS. 1 and 3) which is secured to the end of the rack bar 94 and has a headed rod 123 secured to and extending from the upper end thereof. As the carrier 90 approaches the end of its advancing movement, and as the lead winding operation is nearing completion, the headed rod 123 engages the pin 66 on the cap 60 of the holder and advances it and the cap 60 a predetermined distance in a counterclockwise direction, as viewed in FIG. 4. This effects the movement of the actuating pins 60 along the sloping cam surfaces 54 of the jaws 42 and the movement of the jaws 42 to a retracted position under the influence of the springs 51.

In the operation of the device and with the jaws 42 in their normally closed position, the leads 17 and 18 of the three components 15 are manually inserted into the cooperating grooves 45 and 46 of the jaws 42 and into the apertures 32 and 30, respectively, of the winding shaft 28 and the holder 25, and the component 16 is placed on the holder with the terminal 19 positioned in the central aperture 110 of the wiping member 72 and with the oblique portion 20 of the terminal seated in the oblique groove 48 in one of the jaws 42. The switch 116 is then actuated in one direction to effect the operation of the motor 97 in a forward direction. This, in turn, effects the forward movement of the carrier 90 by the gear 95 and the rack 94, the rotation of the winding shaft 28 through a predetermined number of revolutions by the rack 88 and gear 87, and the progressive downward movement of the winding shaft by the cam 107 and the yoke 100.

During the initial portion of the rotation of the shaft 28 and the wiping member 72, portions of the leads 17 are moved laterally above the wiping fingers 112 into engagement with the terminal 19 and thereafter are wound helically around and downwardly therealong. As the winding progresses and the shaft 28 moves downwardly, the wiping member 72 is yieldably held against the fixed shoulder 78 and against downward movement and the winding fingers 112 thereof emerge from the upper end of the shaft in straddling relation to the leads 17 as successive portions of the leads are withdrawn from the apertures 32 in the shaft and pass between the wiping fingers and are wound helically around the terminal.

The wiping member 72 is held against downward movement until the winding of the leads onto the terminal progresses to the extent where the zone of application of the leads onto the terminal is laterally of the wiping fingers 112 and intermediate the upper and lower ends thereof. At such time the stop surfaces 114 of the shaft engage the arms 75 of the wiping member and effect the movement of the wiping member downwardly with the shaft. Thereafter, as the trailing end portions of the leads 17 are withdrawn from the apertures 32 in the winding shaft, they extend outwardly from the terminal 19 and are disposed in the path of the wiping fingers 112 and are pressed thereby against the terminal 19.

As the winding of the leads onto the terminal approaches completion and in response to the last portion of the forward movement of the carrier 90, the jaws 42 are retracted and the switch 119 is actuated to stop the motor 97. The interconnected components 15, 16 are then removed from the device. Thereafter, the switch 116 is manually actuated in the opposite direction to effect the rotation of the motor in the reverse direction, the return movement of the winding shaft 28 and the wiping member 72 to the normal upper position and the return movement of the carrier 90 to its retracted position at which it actuates the switch 120 and effects the stopping of the motor 97.

In the present disclosure, the leads 17 are relatively long and when wound around the terminal 19 they extend over a substantial distance longitudinally of the terminal. To provide for the winding of the leads through a relatively long distance axially of the terminal, the present device provides for axial movement of the wiping member 72 with the winding shaft 28 during a portion of the movement of the latter. However, it will be understood that where the wrap of the leads around the terminal extends through a relatively short distance longitudinally of the terminal, the leads may be wound around the terminal, and the trailing ends of the leads pressed thereagainst, and the winding operation completed without the need of moving the wiping fingers axially. Where the winding of the leads around the terminal does not require any axial movement of the wiping member with the winding shaft, it will be understood that the mechanism for effecting such axial movement of the wiping member with the winding shaft may be omitted.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for bending an elongated element helically around an article, which comprises:
  holding means for supporting an article concentric with an axis and for supporting an elongated element in an axial direction and in laterally spaced relation to said axis and to the article;
  winding means mounted adjacent to said supporting means for rotation about said axis and having a member provided with an axially directed recess in laterally spaced relation to said axis and to the article on the supporting means for receiving an end portion of the elongated element;
  wiping means mounted for rotation about said axis and having a wiping finger rotatable along a path between the path of movement of said winding member and the article on said supporting means;
  means for rotating said winding means and said wiping means together; and means for moving said winding means axially relative to said wiping means in timed relation to the rotation thereof, said wiping finger extending a predetermined distance in an axial direction and being spaced axially from said holding means to permit said winding member during the initial portion of the rotation thereof to effect the bending of the elongated element between said holding means and said finger into engagement with the article and thereafter to effect the winding of successive portions of the element helically around and along the article and with the trailing end portion of the elongated element as it leaves the recess disposed in the path of movement of said finger for movement thereby against the article.

2. A device for winding a plurality of leads around a terminal, which comprises:
  holding means for supporting a terminal concentric with an axis and for supporting a plurality of leads in parallel and laterally spaced relation to said axis;
  a winding member mounted adjacent to said supporting means for rotation about said axis and having a plurality of axially directed recesses in laterally spaced relation to said axis and to the terminal on said holding means for receiving end portions of the leads;
  a wiping member mounted adjacent to said holding means for rotation about said axis with said winding member and having a plurality of parallel wiping fingers rotatable along a path between said recesses in said winding member and said axis and adjacent to the terminal on said holding means;
  means for rotating said winding member and said wiping member together; and
  means for moving said winding member axially relative to said wiping member and in timed relation to the rotation thereof, said wiping fingers extending a predetermined distance in an axial direction and being spaced from said holding means to permit said winding member during the initial portion of the rotation thereof to effect the bending of the leads between said holding means and said fingers into engagement with the terminal and thereafter to effect the winding of successive portions of the leads helically around and along the terminal and with the trailing end portions of the leads as they leave the recesses disposed in the path of said wiping fingers for movement thereby against the terminal.

3. A device for winding an elongated element helically around an elongated article, which comprises:
  holding means for supporting such an article concentric with an axis and for supporting such an element in an axial direction and in laterally spaced relation to said axis and the article;
  winding means mounted adjacent to said holding means for rotation about said axis and having an axially directed recess in laterally spaced relation to said axis and to the article on said holding means for receiving the end portion of the element;
  wiping means mounted for rotation about said axis with said winding means and having a wiping finger rotatable along a path adjacent to the article on said holding means;
  means for rotating said winding means and said wiping means together;
  means for effecting relative movement axially between said winding means and said holding means in timed relation to the rotation of the former;
  means for effecting relative movement axially between said wiping means and said winding means from a normal position in which said wiping finger is spaced a predetermined distance from said holding means to permit said winding means during the initial portion of the rotation thereof to move the element laterally into engagement with the article and thereafter to effect winding of successive portions of the element helically around and along the article into a zone in lateral alignment with said wiping finger; and means for moving said wiping means axially with said winding means after a predetermined axial movement of said winding means relative to said wiping means to maintain said wiping finger in lateral alignment with the portion of the element being wound onto the article so that said finger can wipe the trailing end portion of the element against the article.

4. A device for winding elongated elements helically around an elongated article, which comprises:

holding means for supporting such an article concentric with an axis and for supporting such elements in parallel and laterally spaced relation to said axis and to the article;

winding means mounted adjacent to said holding means for rotation about said axis and for axial movement and having a plurality of recesses in parallel and laterally spaced relation to said axis and to the article on said holding means for receiving the end portions of the elements;

wiping means mounted for rotation with said winding means and for relative axial movement therebetween and having a plurality of wiping fingers rotatable about said axis along a path adjacent to the article on said holding means;

means for rotating said winding means;

means for moving said winding means axially in timed relation to the rotation thereof from a normal first position adjacent to said supporting means;

means for yieldably supporting said wiping means in a normal position with said wiping fingers spaced a predetermined distance from said supporting means to permit said winding means during the initial portion of the rotation thereof to move the elements laterally into engagement with the article and thereafter to effect winding of successive portions of the elements helically around and along the article into a zone in lateral alignment with said wiping fingers; and means for moving said wiping means axially with said winding means after a predetermined axial movement of said winding means to maintain said wiping fingers in lateral alignment with the portions of the elements being wound onto the article so that said fingers can wipe the trailing end portions of the elements against the article as the end portions emerge from said recesses in said winding means.

5. A device for winding a lead around a terminal, which comprises:

a shaft having an axially directed eccentric recess and a concentric recess in one end thereof;

means for mounting said shaft for rotation about the axis thereof and for axial movement;

a wiping member mounted in said concentric recess in said shaft for rotation with said shaft and for relative axial movement therebetween and having a central aperture for receiving a terminal and having an eccentrically disposed finger extending axially therefrom for rotation along a path adjacent to the terminal;

a holder on said mounting means adjacent said one end of said shaft for supporting the terminal with a portion thereof extending into the aperture of said wiping member and for supporting a lead with a portion thereof extending into the eccentric recess of said shaft;

means for rotating said shaft and said wiping member together;

means for moving said shaft axially relative to said wiping member in timed relation to the rotation thereof; and means for supporting said wiping member in a predetermined position axially of the shaft with the wiping finger spaced from said holder to permit said shaft during the initial portion of the rotation thereof to effect the movement of the lead laterally into engagement with said terminal and thereafter to effect the winding of successive portions of the lead helically along the terminal and with the trailing end portion of the lead as it leaves the aperture being disposed in the path of said wiping finger for movement thereby against the terminal.

6. A device for wrapping a plurality of leads about a terminal, which comprises:

a winding shaft having a plurality of apertures in one end thereof in parallel and spaced relation to the axis thereof for receiving the leads individually and having a recess concentric with the axis;

means for mounting said shaft for rotation about the axis thereof and for axial movement;

holding means on said mounting means adjacent said one end of said shaft for supporting a terminal with a portion thereof extending into the necess of said shaft and for supporting a plurality of leads with portions thereof extending into the apertures of said shaft;

means for rotating said shaft to effect the lateral movement of the leads into engagement with the terminal and the winding of the leads therearound;

means for moving said shaft axially in timed relation to the rotation thereof to effect the winding of the leads helically along the shaft;

a wiping member mounted in the recess in said shaft for rotation with said shaft and for relative axial movement therebetween, said wiping member having a plurality of wiping fingers extending axially therefrom toward said holding means in circumferentially spaced relation to one another for rotation along a path between and in spaced relation to the terminal supported by said holding means and to the path of the apertures in said shaft;

resilient means for stressing said wiping member axially toward said holding means;

means on said mounting means for stopping said wiping means with said wiping fingers spaced from said holding means to permit said winding shaft during the initial portion of the rotation thereof to effect the movement of the leads laterally into engagement with the terminal and thereafter to effect the winding of successive portions of the leads helically around and along the terminal into a zone in lateral alignment with said wiping fingers; and means on said winding shaft for moving said wiping member axially therewith away from said holding means after a predetermined axial movement of said winding shaft to maintain said wiping fingers in lateral alignment with the portions of the leads being wound onto the terminal so that said fingers can wipe the trailing end portions of the leads against the terminal as such end portions leave the apertures in said shaft.

7. A device for wrapping a plurality of leads about a terminal, which comprises:

a winding shaft having a plurality of apertures in one end thereof in parallel and spaced relation to the axis thereof for receiving the end portions of the leads respectively and having a central recess concentric with said axis;

mounting means for supporting said shaft for rotation about said axis and for axial movement;

a carrier supported on said mounting means for movement transversely of said axis;

drive means for effecting the reciprocation of said carrier through a predetermined distance;

means responsive to the reciprocation of said carrier for effecting the rotation of said shaft in opposite directions respectively through a predetermined number of revolutions;

means responsive to the reciprocation of said carrier for moving said shaft axially to and from a normal first position and a second position in timed relation to the rotation of said shaft;

holding means on said mounting means adjacent said one end of said shaft in said first position for supporting a terminal with a portion thereof extending into the central recess and for supporting a plurality of leads with portions thereof extending, respectively, into the apertures of said shaft;

a wiping member mounted in the central recess in said shaft for rotation with said shaft and for relative axial movement therebetween, said wiping member having a central recess concentric with said axis and a plurality of wiping fiingers extending axially therefrom toward said holding means in circumferentially spaced relation to one another for rotation about said axis along a path between and in spaced relation to the terminal supported by said holding means and to the path of the apertures in said shaft;

resilient means for urging said wiping member axially toward said holding means;

means on said mounting means for stopping said wiping means in a normal position with said wiping fingers spaced from said holding means to provide clearance for lateral movement of the leads by said winding shaft into engagement with the terminal; and means on said winding shaft for moving said wiping member axially therewith in a direction from said holding means after a predetermined axial movement of said winding shaft in such direction.

References Cited

UNITED STATES PATENTS 2,688,449  9/1954  Haagensen _____ 242—7
3,185,183  5/1965  Loy _____ 140—93

CHARLES W. LANHAM, *Primary Examiner.*

L. A. LARSON, *Assistant Examiner.*